United States Patent [19]

Mettetal

[11] 4,262,920
[45] Apr. 21, 1981

[54] STEERING STABILIZER

[75] Inventor: Bert J. Mettetal, Tecumseh, Mich.

[73] Assignee: Truck Safety Systems, Inc., Tecumseh, Mich.

[21] Appl. No.: 932,147

[22] Filed: Aug. 9, 1978

[51] Int. Cl.³ ............................................. B62D 53/06
[52] U.S. Cl. .............................. 280/408; 280/411 C; 280/432; 280/456 R; 280/461 R; 280/476 R
[58] Field of Search .................. 280/408, 410, 411 R, 280/411 C, 419, 423 R, 423 A, 426, 432, 442, 456 R, 457, 461 R, 476 R, 476 A

[56] References Cited

U.S. PATENT DOCUMENTS

| 2,459,098 | 1/1949 | Simmons | 280/461 R |
|---|---|---|---|
| 2,561,644 | 7/1951 | Averette | 280/442 |
| 3,348,888 | 10/1967 | Hawk | 280/492 |
| 3,420,547 | 1/1969 | Strausser | 280/432 |
| 3,421,777 | 1/1969 | Barker | 280/476 R |
| 3,486,768 | 12/1969 | Masser | 280/476 R |
| 3,740,076 | 6/1973 | Cupp | 280/432 |

Primary Examiner—John P. Silverstrim
Attorney, Agent, or Firm—Cullen, Sloman, Cantor, Grauer, Scott & Rutherford

[57] ABSTRACT

A steering stabilizer is provided for a conventional multi-trailer combination or train consisting of the usual powered vehicle or pulling tractor constituting the No. 1 element of the train; a lead or first trailer constituting the No. 2 element of the train; a wheeled and rotatable vehicle or dolly constituting the No. 3 element of the train and a rear or second trailer constituting the No. 4 element of the train. A conventional drawbar has one end pivotally connected to the forward end of the frame of the No. 3 element and has the other end pivotally connected to the trailing end of the frame of the lead trailer or No. 2 element. The steering stabilizer is located between the opposing ends of the frames of the leading and rear trailers; is vertically spaced above the drawbar; and has as basic components a telescopic box beam strut reciprocable in a hollow box section or housing having an unsupported and open rearward end and having its forward end pivotally connected on a transverse horizontal axis to the rear frame portion of the lead trailer. The forward end of the telescopic strut reciprocates within the open end of the hollow box section. The rearward end of the telescopic strut is pivotally connected about a generally vertical axis to a pivot coupling which is coupled to an end of a shaft carried by the frame of the rear trailer. The location, arrangement and geometry of the steering stabilizer and drawbar provides rollover and jackknife resistance such that the level of the dynamic stability for the baseline train is substantially increased.

10 Claims, 9 Drawing Figures

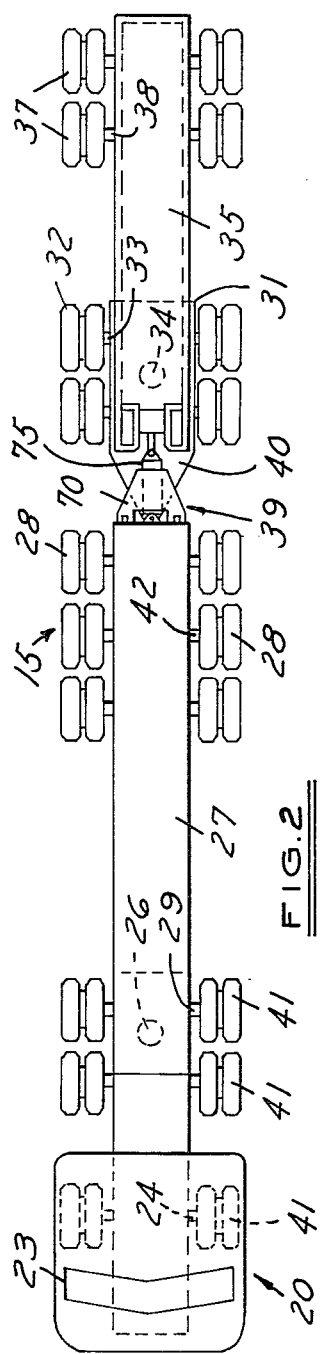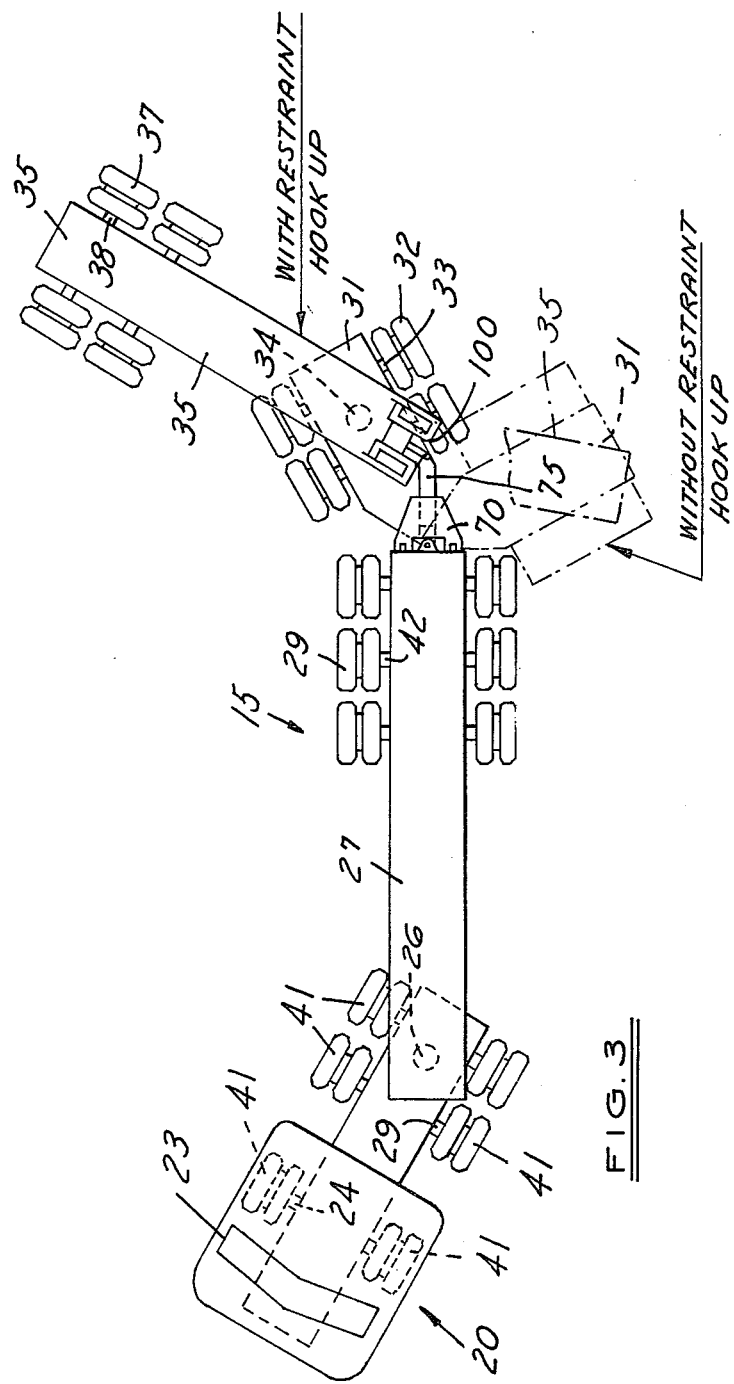

STEERING STABILIZER

BACKGROUND OF THE INVENTION

The invention relates to a multi-trailer combination or train having two or more connected trailers, powered by a tractor, or No. 1 element. One object of the invention is to minimize the oscillatory yaw behavior and rollover tendency between the second or last trailer or No. 4 element and its steerable axle or No. 3 element. An additional object of the invention is to prevent "jackknifing" between the pulled trailers of the multi-trailer assembly or combination.

Numerous types of trailer dolly and hitch arrangements are known in the prior art as being adapted to allow one trailer to be hitched to and pulled behind another trailer, and these prior art dolly and hitch arrangements are mainly responsible for the problems or lack of stability experienced by the multi-trailer combinations.

The majority of dollies or rotatable wheeled vehicles (No. 3 elements) used for coupling multi-trailer combinations, have no means to prevent or limit rotation of the No. 3 element in a horizontal plane about the hitch point on the rear of a pulling trailer. These conventional dollies are provided with a hitch on the forward end of the drawbar which allows the dolly or No. 3 element to freely pivot in such horizontal plane. Additionally, stability against rollover, i.e., pivoting about a longitudinal horizontal axis, of the last trailer or No. 4 element with respect to the towing or first trailer or No. 2 element is exceptionally low because the No. 3 element has a conventional trailer coupler, of fifth wheel, above the axle which is pivotally engaged with the towed or second trailer or No. 4 element in the same manner as the conventional fifth wheel on the tractor or No. 1 element is pivotally engaged with the first trailer or No. 2 element. Thus, the last trailer or No. 4 element receives no roll support from the lead or towing semi-trailer, particularly in evasion type maneuvers.

The steering stabilizer of the present invention is applicable to all multi-trailer tractor combinations, but it finds special application for tandem or double-bottom tankers because of their unique stability problems. Double tankers typically carry approximately 9,000 gallons of fuel in the lead or towing tanker and approximately 7,000 gallons of fuel in the trailer or second tanker. The No. 2 element by law is the heaviest vehicle of the so-called train. The obvious reason for using tandem tankers is to reduce the number of tractors and operators required, theoretically reducing the likelihood of accidents and decreasing costs including costs of operation.

Unfortunately, the rollover stability and sway stability of known double bottom tanker combinations is exceptionally low, particularly in accident evasion type maneuvers. This problem is accentuated because, unlike other multi-trailer combinations, the tandem tankers are frequently towed when they are only partially loaded with fuel. The sudden movement or sloshing of the fuel within the tankers during high speed or emergency maneuvers drastically decreases the roll and sway stability of the last trailer or No. 4 element. It is not uncommon for the No. 4 element or second trailer to overturn and explode, resulting in a serious highway accident with resultant loss of life, limb, and property.

The double tanker combination has definite stability problems, with the primary problem residing in the behavior of the second trailer or No. 4 element of the train. In emergency lane change maneuvers, the second trailer amplifies the yaw motions of the tractor and towing trailer. At a high frequency range of steering inputs, the second trailer or No. 4 element experiences roll or overturning accelerations which are more than twice as large as that experienced at the tractor or No. 1 element. In addition to oscillatory yaw behavior, the second trailer has a low level of basic rollover immunity. In a steady turn situation, the rollover limit of the loaded second trailer is approximately 20% lower than that exhibited by most heavy commercial vehicles. For emergency lane changes, the double tanker will experience rollover at a maneuvering level which is less than half of the maneuvering level that is needed to roll over conventional tractor, semi-trailer combinations. Thus, the known double tanker combination exhibits an exceptionally low degree of yaw and roll stability with the second trailer or No. 4 element contributing most significantly to the problem.

The dynamic stability of a multi-trailer tractor combination involves not only its resistance to oscillatory yaw and rollover but also its resistance to jackknifing, i.e., the inadvertent gross longitudinal misalignment of the trailers about the vertical pivot axis connection between the tractor and the lead trailer or between the lead trailer and the trailing or second trailer. Jackknifing or buckling occurs when a semi or full trailer pushes its towing vehicle in such a manner that a very acute angle results between the units. The jackknifed condition frequently leads to a disastrous loss of control which is a hazardous problem when the roadway is slick from rain or ice.

The prior art has attempted to prevent jackknifing by various means such as trailer brakes which are actuated by the tractor operator from the tractor cab in an emergency situation. For tandem trailers, the trailers must be prevented from pivoting about their vertical pivot axis connection into a longitudinally misaligned condition. Otherwise, the momentum of the swerving trailer causes the two trailers to close upon one another as blades of a jackknife.

It is accordingly the general objective of the present invention to provide a rollover and jackknife-resisting apparatus between a lead or towing trailer (No. 2 element) and a towed or second trailer (No. 4 element) which minimizes oscillating yaw behavior of the second trailer, provides roll support from the lead trailer to the second trailer, and increases the basic rollover immunity of the second trailer.

DESCRIPTION OF THE PRIOR ART

Various means have been employed in the art for connecting front and rear trailers together including fifth wheel connections, drawbar connections, and cables. In addition, various devices are illustrated in the prior art for the specific purpose of eliminating jackknifing between pulled trailers and for controlling the dynamic stability between the trailers during emergency maneuvering. Typical trailer constructions directed to the foregoing problems are illustrated in the following U.S. Pat. Nos. 3,421,777; 3,480,295; 3,659,874; 3,740,076; 3,782,759; 3,787,077; 3,815,939; 4,003,586; and 4,068,860. Even though some of the prior art devices illustrate anti-jackknifing couplings between trailers, none of them illustrate a telescopic strut trailer connection which prevents oscillating yaw behavior, rollover, and jackknifing of the trailers.

SUMMARY OF THE INVENTION

The steering stabilizer or rollover and jackknife-resisting apparatus of the present invention includes a trailer connection linkage apparatus mounted between a first, lead or towing semi-trailer and a second, trailing or towed semi-trailer. The resistance apparatus may, in connection with a new trailer, be manufactured as part of the original frame of the towed or second trailer or, in the case of a used trailer, the apparatus may be retrofitted or added to the existing frame. The purpose of the rollover and jackknife-resisting apparatus is to minimize or eliminate the oscillating yaw behavior of the second trailer, provide roll support to the second trailer, and prevent gross longitudinal misalignment between the towing trailer and the towed or second trailer.

The steering stabilizer or rollover and jackknife-resisting apparatus of the present invention includes two trailer connections between the lead and rear trailers. The first trailer connection comprises a conventional drawbar which is pivotally connected at one of its ends to the rear frame portion of the lead or towing trailer for both horizontal and vertical pivoting, and is pivotally connected at its other end to the frame of the rotatable vehicle or No. 3 element for pivoting about only a transverse horizontal axis. The second trailer connection, mounted vertically above the first connection, is pivotally connected at one of its ends to the rear end of the lead trailer's bed or base for pivotal movement about a transverse horizontal axis, and is pivotally connected at its other end to a pivot coupling extending from a housing formed in the front bed or base of the second trailer or No. 4 element.

The second trailer connection includes a telescopic strut that provides rigidity to the frame of the last or second trailer in both its yaw and roll degrees of freedom. Both trailer connections are necessary for dynamic stability of the lead and second trailers, but the telescopic strut connection is the most significant item for providing rigidity to the second trailer against oscillating yaw behavior, rollover and jackknifing.

The first trailer connection between the lead and second trailers is a conventional drawbar attached to the rear of the leading or first trailer and provided with rearwardly diverging arms having yoke-like ends pivotally connected to the dolly frame of the No. 3 element.

The drawbar alone has failed to provide the needed dynamic stability to the second trailer in that the second trailer, with only a drawbar connection, has exhibited oscillatory yaw behavior and a tendency toward rollover. The telescopic strut connection or steering stabilizer between the lead and second trailers has been added to provide rigidity to boh the dolly frame or No. 3 element and drawbar in both their yaw and roll degrees of freedom.

The steering stabilizer or telescopic strut connection of the present invention is mounted between the lead and rear trailers vertically spaced above the drawbar, and it has as its basic component a beam strut reciprocable in a hollow box section or housing. The front end of the hollow box section or housing is connected to the rear frame portion of the lead trailer by a transverse horizontal pivot axis, while the front end of the beam strut reciprocates within the open rearward end of the hollow box section. The rear end of the telescopic strut is connected to a pivot coupling which is mounted in the trailer bed of the second trailer.

The telescopic strut connection of the present invention provides rigidity to the frame of the No. 3 element against oscillating yaw behavior, rollover and jackknifing such that the level of dynamic stability of the baseline train is substantially increased. With this trailer connection fitted between the lead and rear trailers, the baseline train is conceptually reduced from a fourelement vehicle (tractor, lead trailer, second trailer dolly frame, rear trailer) to a three-element vehicle (tractor, lead trailer, rear trailer), and therefore, the rear or second trailer does not experience the overturning accelerations during sudden and severe maneuvers of the tractor that, without the trailer connection of the present invention, are more than twice as large as that experienced at the tractor during such maneuvers. A tandem trailer or tanker combination fitted with this unique telescopic strut connection or steering stabilizer will have a stability level comparable to that of the tractor and lead trailer portion of the baseline train alone.

The present invention permits the tractor and lead trailer to aid in the stabilization of the rear or second trailer. In rapid maneuvers, the tractor or No. 1 element of the train is the first element of the train to respond to dynamic stimulus, then the lead trailer or No. 2 element and finally the rear or second trailer or No. 4 element. The tractor and lead trailer are already past a peak roll stimulus before the second trailer is stimulated by the same overturning stresses, and further, the tractor and lead trailer normally experience less rollover stimulus than the second trailer. The telescopic strut connection of the present invention helps the lead trailer to hold the rear or second trailer from overturning when the baseline train is rapidly maneuvered causing overturning accelerations.

The steering stabilizer or telescopic strut connection of the present invention can be economically constructed for original installation or retrofitting on existing double tanker combinations, and an existing double tanker, retrofitted with such trailer connection, will experience substantially greater dynamic stability than is possible with existing dolly hitches alone. The construction of the present invention provides numerous advantages over the prior art including reduction of the oscillating yaw behavior of the rear or second trailer, supporting of the second trailer against rollover and prevention of gross longitudinal misalignment between the trailers.

Other advantages and meritorious features of this invention will be more fully appreciated from the following detailed description and the appended claims.

BRIEF DESCRIPTION OF THE DRAWINGS

FIG. 2 is a top view of the baseline train with the tanker units removed for easier viewing of the trailer frames and their connections;

FIG. 3 is a top view similar to FIG. 2 showing the rear trailer in a jackknife-prevented condition;

DETAILED DESCRIPTION OF THE INVENTION

Figure 1:
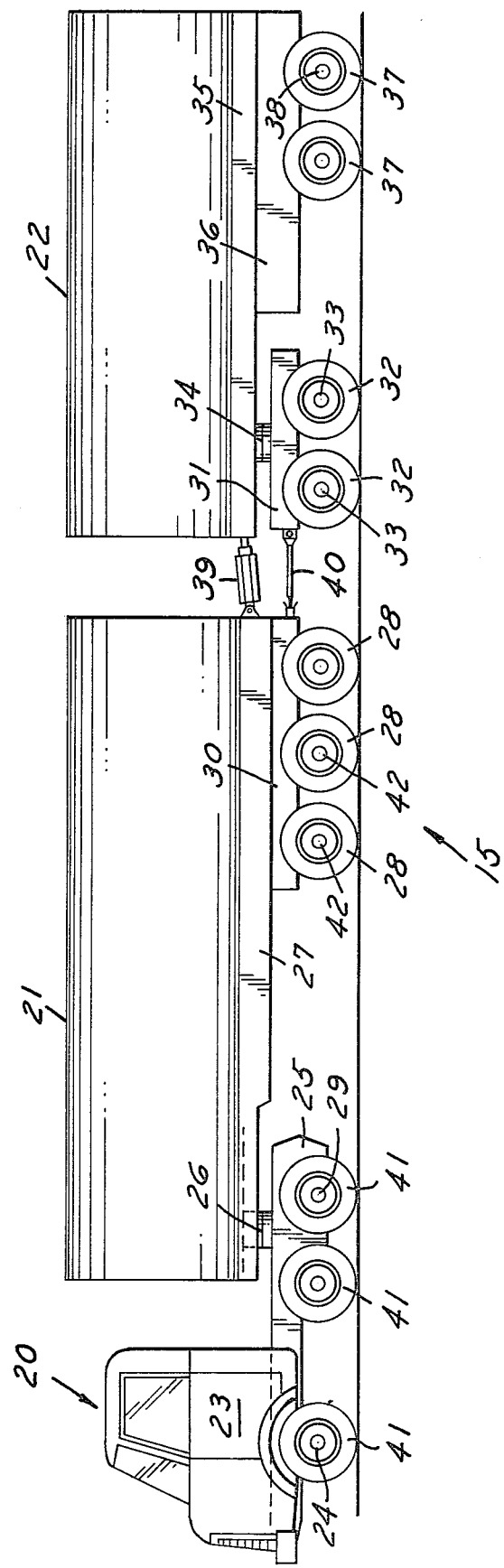
FIG. 1 is an overall side elevational view of a tractor pulling tandem trailers connected by the steering stabilizer connection of the present invention.

The teachings of the present invention, as discussed herein, are applicable to a wide variety of road vehicles regardless of the use of the vehicles. The multi-trailer combination may be used as tankers for carrying gasoline, oil, milk or other liquids, and for trailers carrying conventional shipping containers or other types of cargo such as steel, etc. Referring to FIG. 1, the multi-trailer combination, train or assembly 15 includes a power unit or self-propelled tractor 20 constituting the No. 1 element of the so-called train; a towing, lead or first trailer 21 constituting the No. 2 element of the train; a wheeled or rotatable vehicle or dolly 31 constituting the No. 3 element of the train; and a towed or second trailer 22 constituting the No. 4 element of the train. The tanker units, as illustrated, are designed to carry a flammable liquid. The tractor or No. 1 element 20 includes a forwardly disposed operator's cab 23 mounted directly over the tractor front axle 24. The tractor 20 includes a chassis 25 which carries the tractor rear drive axles 29. Drive wheels 41 are provided on the front and rear axles 24, 29 of the tractor or No. 1 element 20.

The lead or first trailer 21 is connected to tractor 20 by a conventional relatively flexible hitch 26 including a pivotally mounted fifth wheel connected to a kingpin (not shown) on the front end of the first trailer 21. With such an assembly relative pivotal movement is permitted between the tractor 20 and first trailer 21 constituting the No. 1 element and the No. 2 element respectively. The first trailer 21 or No. 2 element includes a trailer bed or frame 27 including longitudinally extending and laterally spaced support members as is well known in the art. The rear end portion of the lead trailer 21 or No. 2 element is supported by three sets of dual road engaging wheels 28 mounted on axles 42, and the axles 42 are mounted to the underside of the trailer bed 27 on a rear frame portion 30.

The towed or second tanker or trailer 22 or No. 4 element is provided with a trailer frame 35 including a pair of elongated channel-shaped members extending longitudinally. The front part of the rear trailer frame 35 is connected to another conventional flexible hitch 34 including a pivotally mounted fifth wheel connected to a kingpin (not shown) on the front end of the second trailer 22. The fifth wheel assembly 34 is mounted on the dolly frame of an independently steerable wheeled vehicle constituting the No. 3 element of the so-called train. The steerable vehicle 31 has ground engaging wheels 32 mounted on axles 33. The rear end of the second trailer bed 35 is supported on a rear frame portion 36 to which is mounted axles 38 and ground engaging wheels 37.

In a conventional multi-trailer combination 15, the wheeled or steerable vehicle 31 or No. 3 element comprises one or more axles, with the framework thereof being rotatable about the axis of a vertical shaft or pivot pin commonly referred to as the turntable or fifth wheel 34 as is well known in the art.

The lead or first trailer 21 or No. 2 element is connected first to the steerable vehicle 31 or No. 3 element by a conventional drawbar 40 and second to the front end of the frame of the second trailer 22 or No. 4 element by the steering stabilizer or telescopic strut trailer connection 39. Specifically, the drawbar 40 is connected between the rear frame portion 30 of the lead trailer 21 or No. 2 element and the frame 31 of the No. 3 element while the telescopic strut trailer connection 39 is connected between the trailer bed 27 of the lead trailer 21 or No. 2 element and the trailer bed 35 of the second trailer 22 or No. 4 element.

Referring to FIGS. 2 and 3, the multi-trailer combination 15 is shown with the tanker units 21 and 22 removed from the trailer frames 27 and 35 for easier viewing of one feature provided by the present invention.

In FIG. 2, the self-propelled tractor 20 or No. 1 element, supported by ground engaging wheels 41, is pulling the first and second trailers (Nos. 2 and 4 respectively) along a straight line simulating normal road and steering conditions. During normal steering maneuvers by the tractor 20 and good road conditions, the drawbar 40 provides adequate trailer connection between the lead or first trailer 21 and the second trailer 22 such that the second trailer 22 generally follows the path of the towing or lead trailer 21.

The drawbar 40 is pivotally connected at one of its ends to the rear frame portion 30 of trailer 21 for both horizontal and vertical pivoting, whereas its other end is pivotally connected to the front end of the frame 31 of the No. 3 element for pivoting only about a transverse horizontal axis. In a normal turning maneuver, the drawbar 40 turns the frame 31 of the No. 3 element out of longitudinal alignment with respect to the front end trailer bed 35 of No. 4 element as best seen in FIG. 3. Thus, under normal conditions, the drawbar 40 provides sufficient trailer connection for the pulling of the second trailer 22 by the first or towing trailer 21.

The problem with using drawbar 40 as the only connection between lead or first trailer 21 and the second trailer 22 is that the second trailer 22 receives no rollover support from the lead trailer 21 nor is there any jackknife-preventing connection between the two trailers 21 and 22.

The front end of the second trailer 22 is connected to the frame 31 of the No. 3 element by a conventional flexible hitch 34 including a pivotally mounted fifth wheel connected to a kingpin on the front end of the second trailer 22, as is conventional in the art whereby the No. 4 element is mounted for relative pivotal movement on the fifth wheel of the No. 3 element. Under steady turn conditions, the rollover limit for the second trailer is approximately 20% less than that for conventional commercial vehicles, and for emergency lane changes, second trailer rollover occurs at a maneuvering level which is one-half that needed to roll over conventional tractor-semi-trailer combinations.

It should be understood that any steering signal generated at the tractor steering wheels cannot be magnified beyond the original steering radius experienced by the tractor wheels. Thus as shown in FIG. 3 as the No. 1 element or tractor 20 turns, the No. 2 element or lead trailer 21, which is the heaviest vehicle in the train, moves forward in a straight line. The No. 3 element or dolly vehicle 31 turns, as the weight of the No. 4 element or rear trailer 22 moves forward in a straight line. Thus the Nos. 1 and 3 elements are the only elements that turn, with the Nos. 2 and 4 elements (trailers 21 and 22) moving forward in a straight line. The No. 3 and No. 4 elements are unable to move out of the turning radius of the tractor 20 unless the tractor turning radius is changed since they are controlled by the steering axle of the tractor 20 or No. 1 element.

The No. 2 element or first trailer 21 will not turn unless the tractor 20 (No. 1 element) signals the movement. The driver of the tractor 20 may even let up on the throttle or turn the wheels of the tractor 20 causing the No. 2 element to move in a straight line resulting in the No. 1 element turning sideways. Then the No. 4 element moves in a straight line, causing the No. 3 element to turn as did the No. 1 element or tractor 20. Thus the No. 1 element or tractor 20 controls or signals the No. 3 element, with the result that the No. 2 and No. 4 elements move. No turn radius can be generated by the No. 3 and No. 4 elements without a turn radius signal from the steering axle or wheel of the No. 1 element or towing tractor 20.

The first or second trailer 21 or 22 with the largest radius (the trailer having the longest wheel base) is the one that controls the seriousness of the jackknifing condition.

The second trailer 22, which is lighter than the first trailer 21, will not be misaligned from the general tracking or steering radius of the multi-trailer combination 15 since the lead trailer 21 is the heaviest vehicle of the so-called train. In order for the No. 4 element or second trailer 22 to be able to cause its towing vehicle 31 or No. 3 element to move out of the established turning radii of the multi-trailer combination as determined by the signal from the tractor 20, the No. 4 element would also have to cause the axle or axles 42 of the lead or first trailer 21 to break the traction of the tire to road surface.

The steering stabilizer or telescopic strut trailer connection 39, of the present invention, provides the needed support from the lead or first trailer 21 to the second trailer 22, thereby minimizing the possibility of the second trailer 22 rolling over or becoming grossly longitudinally misaligned under jackknife conditions.

Referring to FIGS. 1-3, the steering stabilizer or telescopic strut trailer connection 39 is mounted between the lead or towing trailer 21 and the towed or second trailer 22, and it is vertically spaced above the drawbar 40. FIGS. 2 and 3 illustrate the longitudinal extension of the telescopic strut or box beam 75 within the hollow box section or housing 70, which is formed as part of the steering stabilizer 39. The telescopic strut 75 is almost entirely housed within the hollow box section 70 when the lead or first trailer 21 is longitudinally aligned with the rear or second trailer 22 as in FIG. 2. In a steady turn condition, the telescopic beam 75 is extended outwardly from the hollow box section 70 as viewed in FIG. 3, and as will be subsequently discussed in greater detail.

The steering stabilizer or telescopic strut trailer connection 39 of the present invention provides dynamic stability to the second trailer 22 against rollover and jackknifing. The phantom line position of the second trailer 22 and its dolly frame 31 or No. 3 element, shown in FIG. 3, exemplify a jackknifed condition that can result if the only connection between trailers 21 and 22 is the conventional drawbar 40. Adding telescoping strut connection or steering stabilizer 39 would normally prevent the second trailer 22 from rolling over or jackknifing unless there were very severe maneuvering stresses or upon failure of the stabilizer 39 itself.

A more detailed description of the structure and features that form a part of the steering stabilizer or telescopic strut trailer connection of the present invention will be found by reference to FIGS. 4-9.

Figure 5:
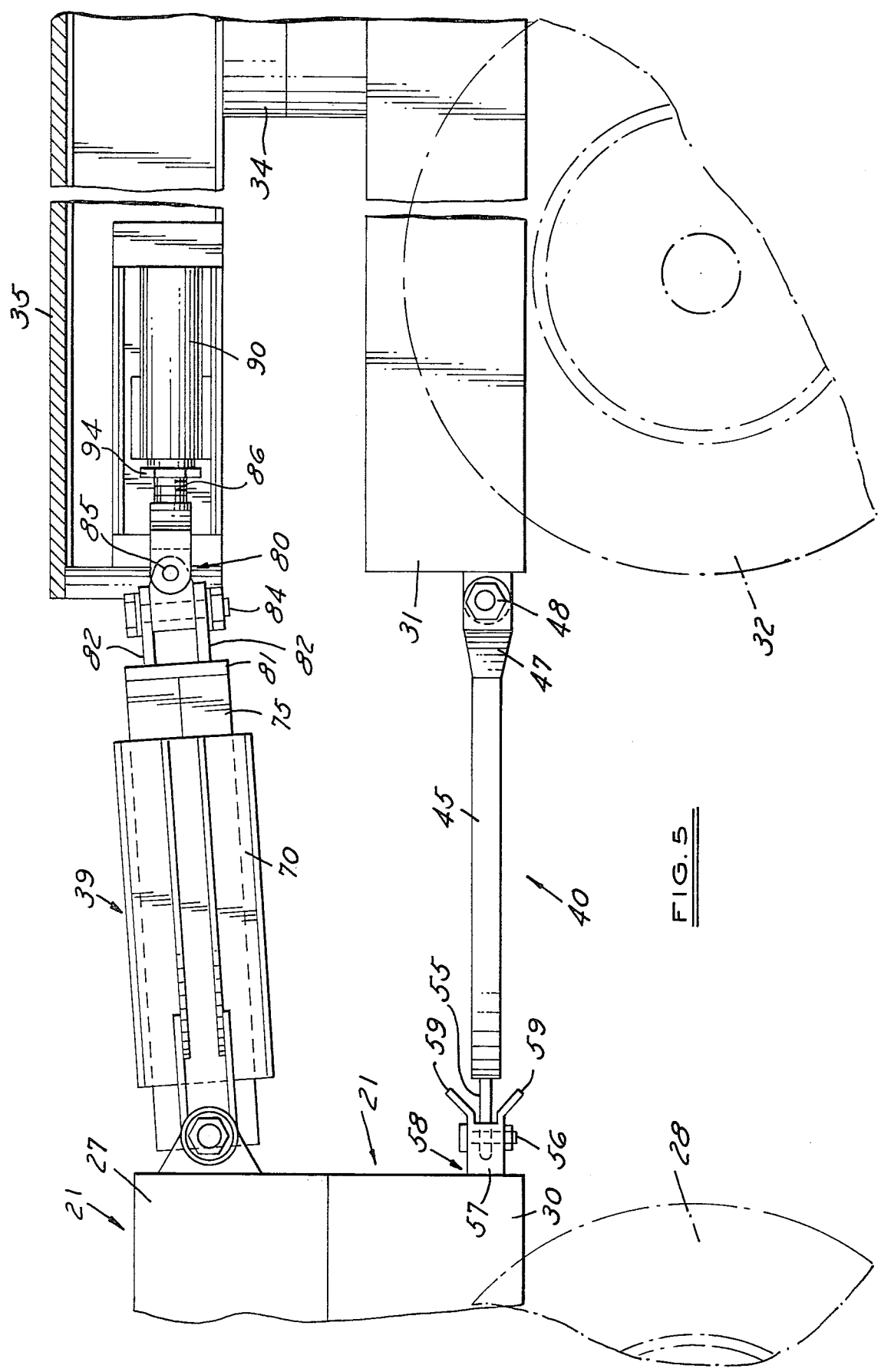
FIG. 5 is a side elevational view of the steering stabilizer connection and drawbar connection, with the tanker units removed from the frames.

As best seen in FIG. 5, the dolly hitch or drawbar 40 is connected at its forward end to the rear frame portion 30 of lead trailer 21, and it is connected at its rear end to the front of towing dolly frame 31 constituting the No. 3 element. The forward end 55 of drawbar 40 has a ring opening 57 through which a bolt 56 or other suitable fastening device is inserted to secure the drawbar end 55 to coupler 58 which is welded or otherwise secured to the rear frame 30 of lead trailer 21. The ring opening 57 in the end 55 of drawbar 40 has a greater diameter than the portion of bolt 56 passing through it thereby permitting the drawbar 40 to pivot both horizontally and vertically at its forward end. Diverging legs 59 of the coupler 58 also permit a restricted amount of vertical pivoting by the end 55 of dolly hitch or drawbar 40.

Figure 4:
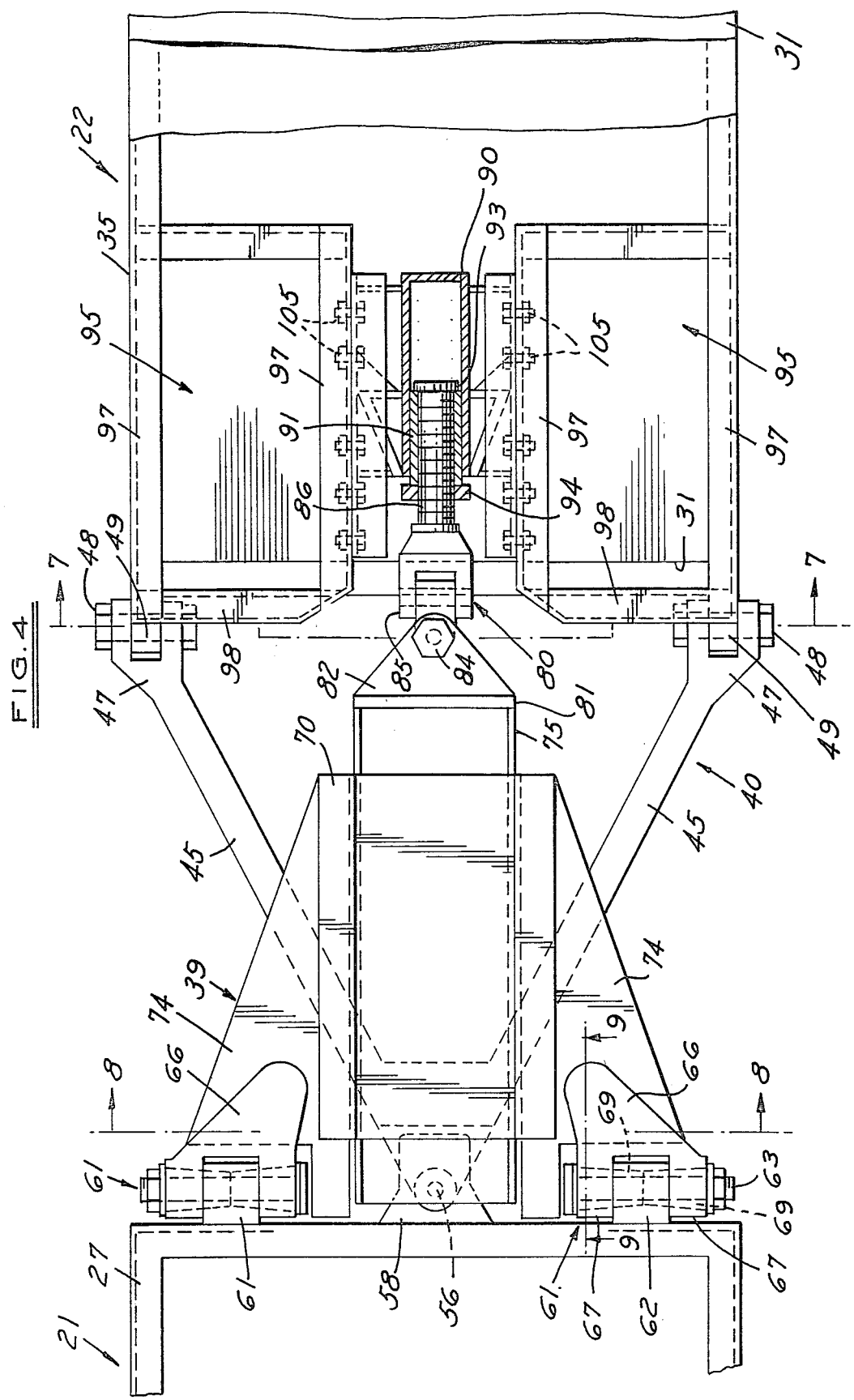
FIG. 4 is a top plan view of the steering stabilizer connection and drawbar connection, with the tanker units removed from the frames.
Figure 6:
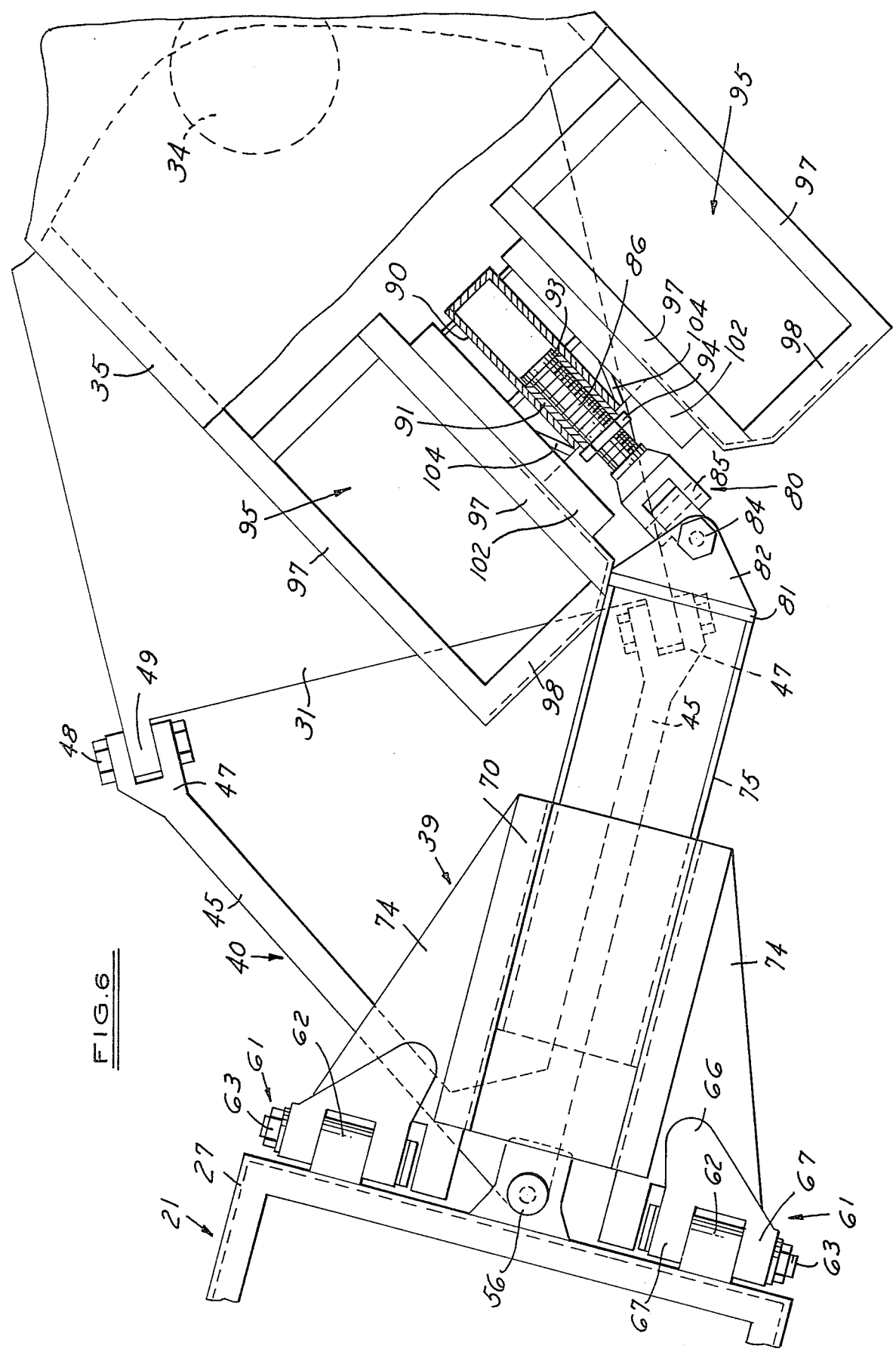
FIG. 6 is a top plan view similar to FIG. 4 with the steering stabilizer connection resisting the forces causing a jackknife condition.
Figure 7:
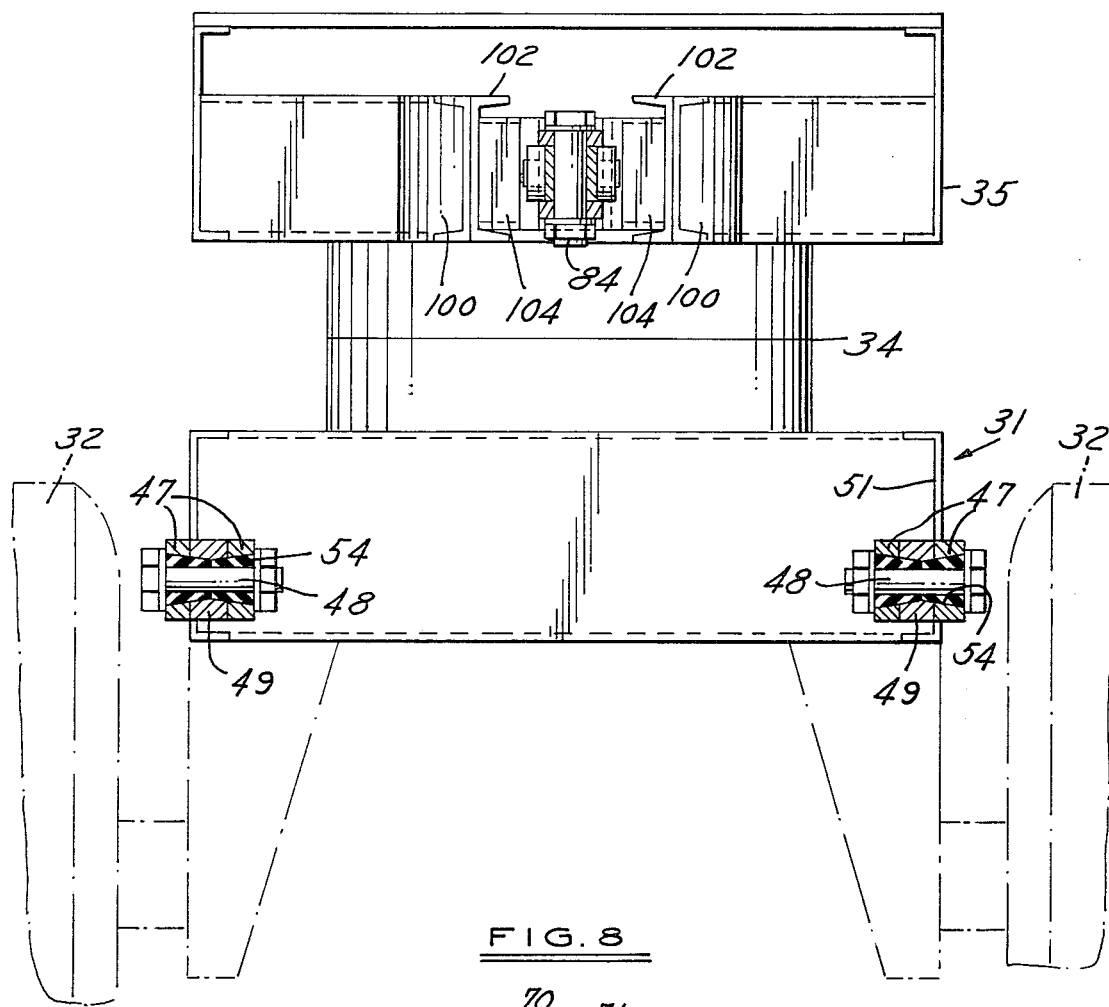
FIG. 7 is a cross-sectional view taken along the line 7—7 in FIG. 4 showing the rear part of the steering stabilizer connection.

Referring to FIGS. 4, 6 and 7, the drawbar 40 has arms 45 which rearwardly diverge from the end 55 and terminate in yoke-end portions 47. End portions 47 are secured to lugs 49 by horizontal pivot bolts 48 which turn in press-fitted, conical bearings 54 (FIG. 7), and drawbar 40 is only capable of pivoting in a vertical plane about the horizontal pivot bolts 48. Lugs 49 are mounted to the front end of the towing dolly frame 31 of No. 3 element which is made of longitudinal and lateral extending channel members 51 (FIG. 7).

The front end of the second trailer frame 35 is pivotally mounted on the conventional fifth wheel 34 as viewed in FIGS. 5-7 for relative pivotal movement therebetween. Under turning conditions, the dolly hitch or drawbar 40 forces the towing dolly frame 31 of the No. 3 element to turn relative to the trailer frame 35 of the No. 4 element so that the two are no longer longitudinally aligned as best seen in FIG. 6.

The steering stabilizer or telescopic strut trailer connection 39 of the present invention will be described in detail by reference to FIGS. 4-9, and it has as its basic components a hollow box section or housing 70, a telescopic strut or box beam 75, a pivot coupling 80, and a shaft or ram 86 mounted for clockwise and counterclockwise rotation. The trailer connection 39 is inexpensively constructed, and it may be installed as original equipment or retrofitted on exiting trailer combinations.

Figure 8:
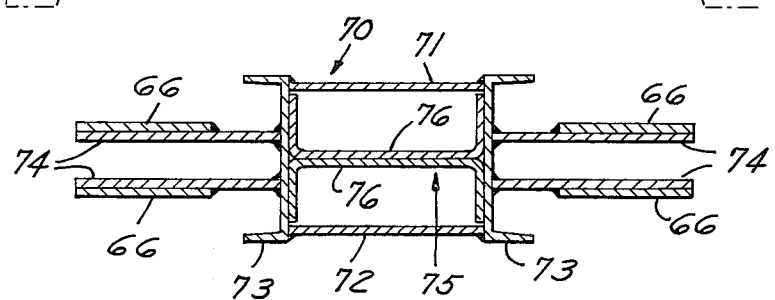
FIG. 8 is a cross-sectional view taken along the line 8—8 in FIG. 4 showing the hollow box section and telescopic beam.

The hollow box section or housing 70 is formed by outwardly turned, C-shaped channel side members 73 separated by top and bottom plates 71 and 72 which are welded to the side members 73 to form a hollow box or housing (FIG. 8). Triangular support plates 74 are welded to the channel side members 73 for attachment to bearing assemblies 62.

Figure 9:
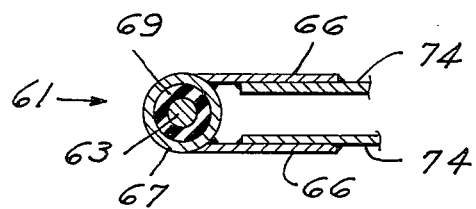
FIG. 9 is a cross-sectional view taken along the line 9—9 in FIG. 4 showing the bearing assembly for the hollow box section.

The triangular support plates 74, mounted to each side of the hollow box section 70, are sandwiched between and welded to depending legs 66 from the yoke portions 67 of bearing assemblies 62 (FIGS. 8 and 9). Yoke portions 67 of bearing assemblies 61 are secured to lugs 62 by horizontal pivot bolts 63 having a horizontal pivot axis. The bolts 63 turn or rotate in press-fitted, conical bearings 69 (FIGS. 4 and 9), and lugs 62 are mounted to the rear end of lead trailer bed or base 27.

The hollow box section 70 is held in a cantilevered fashion for pivoting only about horizontal pivot pins or bolts 63.

A telescopic strut or box beam 75 is mounted within hollow box section 70 for movement in response to that by the second trailer 22. The box beam 75 is made by welding U-shaped channel members 76 back-to-back as shown in FIG. 8. Mounted on the free end of strut 75 is an end plate 81 having parallel lug plates 82 secured thereto as shown in FIGS. 5 and 6.

The free end of box beam 75 is pivotally connected to a pivot coupling 80 to permit the second trailer 22 to pitch and yaw relative to the box beam 75. Pivoting about a vertical axis (i.e., yaw) is permitted by vertical pivot pin 84 which secures the pivot coupling 80 between the spaced lugs 82 of telescopic strut 75. Pivoting about a transverse horizontal axis (i.e., pitch) is permitted by horizontal pivot pin 85.

The pivot coupling 80 is at one end of a rotatable shaft or ram 86 mounted in bearing sleeve 91 which in turn is located in an annular housing 90. The shaft 86 is held against linear movement by end plate 93 and by nut 94 as shown in FIG. 6. The shaft 86 and housing 90 are mounted between box-like frame sections 95 formed at the front end of the frame 35 of the second trailer 22. The box-like frames 95 are made from longitudinal side channel members 97 separated by laterally spaced channel members 98. Referring to FIGS. 6 and 7, inwardly opening channel members 102 secure support struts 104 which hold the housing 90 in position between the box-like frames 95. The channel members 102 can be secured to the box frame side channel members 97 by bolts 105, shown in FIG. 4, or by any other conventional securing means.

The geometry, construction and arrangement of the combined drawbar 40 and the steering stabilizer 39 assembly form a parallelogram as described previously and provide rollover and jackknife resistance such that the level of the dynamic stability for the baseline train is substantially increased. The vertical pivot pins or axes of the drawbar 40 and steering stabilizer 39 are spaced 180° apart and are parallel. Such axes form two sides of the parallelogram, with the other two sides formed by planes containing the horizontal pivot axes as noted previously. The two vertical pivot pins, located 180° apart, oppose one another. When the steering stabilizer 39 is installed and operative it is impossible for the drawbar 40 to swing about its vertical pivot pin 56 becaue there is an opposing pivot pin 84 located 180° from the first pivot 56. The pivot pins or points 56 and 84 act together and oppose the conventional forces tending to cause jackknifing of the trailers. Thus it is not possible for the No. 3 element and the No. 4 element to act independently of the No. 1 and No. 2 elements.

The operation of the steering stabilizer or telescopic strut trailer connection 39 of the present invention is best described by reference to FIGS. 4-6. FIG. 4 shows the lead or first trailer 21 and the rear of the second trailer 22 longitudinally aligned under normal straight driving conditions. During rapid maneuvering around a sharp corner, for example, the tractor 20 generates the steering signal for the multi-trailer combination 15. As the No. 1 element or tractor 20 turns, the No. 2 element or lead trailer 21 moves forward in a straight line. The No. 3 element or dolly vehicle 31 turns, as the weight of the No. 4 element or second trailer 22 moves forward in a straight line. With the use of the steering stabilizer 39, the No. 3 element cannot be forced to turn when the force of the No. 4 element is applied except upon direction or signal from the tractor 20. The telescopic strut trailer connection 39 helps the lead trailer 21 to hold the second trailer 22 from overturning when the baseline train suddenly experiences overturning accelerations. The lead trailer 21 is already past its peak roll stimulus point before the second trailer 22 is stimulated by the same overturning stresses, and thus, the lead trailer 21 through the steering stabilizer or telescopic strut trailer connection 39 helps to hold the second trailer 22 against the same overturning stresses experienced by it, thereby dynamically stabilizing the entire baseline train.

FIG. 6 shows the second trailer 22 in a turning condition with the telescopic beam 75 extended outwardly from hollow box section or housing 70. Under normal turning conditions, the second trailer 22 will pivot relative to its dolly frame support 31 to a longitudinally misaligned position. The rotatable shaft 86 assumes the position of FIG. 6 when the second trailer 22 turns. The shaft 86 pulls the box beam 75 out of its housing 70, and the two elements pivot with respect to each other about vertical pivot axis 84. When the second trailer 22 becomes grossly longitudinally misaligned with the lead trailer 21, as in FIG. 6, the forces tending to overturn or jackknife the trailers are opposed by the steering stabilizer or telescopic strut trailer connection 39 which provides dynamic stability to the baseline train.

The element of steering control previously described becomes important when the multi-vehicle or trailer combination 15 or so-called train is operated in reverse. It is no longer reuired to use a mechanical locking pin between the No. 3 and No. 4 elements to control the pivotal action of the dolly 31 or No. 3 element in relation to the second trailer 22 since the steering control is provided by the stabilizer 39. When backing up or reversing the train, the same steering motion is used as in the forward direction described previously. The train 15 can be backed up in a straight line or backed up on a curve or radius to get into difficult locations.

It will be apparent to those skilled in the art that the foregoing disclosure is exemplary in nature rather than limiting, the invention being limited only by the appended claims.

What is claimed is:

1. A trailer assembly adapted to be transported by a tractor comprising a lead trailer having front and rear frame portions, said front frame portion of said lead trailer being adapted to be pivotally connected to the tractor, a rear trailer having front and rear frame portions, a steerable towing vehicle located under the front frame portion of said rear trailer, said rear trailer being pivotally connected to said steerable towing vehicle, a first trailer connection means pivotally connected at one end to said rear frame portion of said lead trailer and pivotally connected at its other end to said steerable towing vehicle, and a second trailer connection means pivotally connected at one end to said rear frame portion of said lead trailer and pivotally connected at its other end to said front frame portion of said rear trailer, said first trailer connection means comprises a drawbar having its forward end pivotally connected to the rear frame portion of said lead trailer for pivotal movement about both a vertical axis and a horizontal axis, said drawbar having its rearward end pivotally mounted to said steerable towing vehicle for pivotal movement about a transverse horizontal axis, said second trailer connection means comprises two stabilizing members, coupling means pivotally connecting said stabilizing members to one another, a first of said stabilizing members being mounted in a housing pivotally connected to the rear frame portion of said lead trailer for pivotal movement about a horizontal axis, and a second of said stabilizing members being supported by said front frame portion of said rear trailer for limited rotative movement about a longitudinal axis whereby said second trailer connection means provides stability from said lead trailer to said rear trailer.

2. The trailer assembly defined in claim 1 wherein said drawbar having its forward end mounted on a hitch located on the rear frame portion of the lead trailer, said drawbar having rearwardly diverging arms from said hitch connection terminating in yoke-like end portions which are pivotally connected to said steerable towing vehicle for pivotal movement about a horizontal axis.

3. The trailer assembly defined in claim 1 wherein said housing for said first stabilizing member comprises a hollow boxlike housing having an open end and another end pivotally connected about a horizontal axis to said rear frame portion of said lead trailer, said first stabilizing member being a telescopic strut movable within the open end of said housing, said second stabilizing member being a shaft mounted for rotation in said front frame portion of said rear trailer.

4. The trailer assembly defined in claim 3 wherein said coupling means, pivotally connecting said stabilizing members, permits horizontal pivoting between said stabilizing members about an axis transverse to the longitudinal axis of said lead trailer and vertical pivoting between said stabilizing members about an axis perpendicular to the longitudinal axis of said lead trailer.

5. The trailer assembly defined in claim 3 wherein said telescopic strut is rectangularly shaped for sliding movement within said housing.

6. A trailer assembly adapted to be transported by a tractor comprising a lead trailer having front and rear frame portions, said front frame portion of said lead trailer being adapted to be pivotally connected to the tractor, a rear trailer having front and rear frame portions, a steerable towing vehicle located under the front frame portion of said rear trailer, said rear trailer being pivotally connected to said steerable towing vehicle, a first trailer connection means pivotally connected at one end to said rear frame portion of said lead trailer and pivotally connected at its other end to said steerable towing vehicle, and a second trailer connection means pivotally connected at one end to said rear frame portion of said lead trailer and pivotally connected at its other end to said front frame portion of said rear trailer, said first trailer connection means comprises a drawbar having its forward end pivotally connected to the rear frame portion of said lead trailer for pivotal movement about both a vertical axis and a horizontal axis, said drawbar having its rearward end pivotally mounted to said steerable towing vehicle for pivotal movement about a transverse horizontal axis, and said second trailer connection means comprises a pair of first and second interconnected members, one member having its forward end mounted on said lead trailer for pivotal movement about a horizontal axis, and said members being mounted for limited rotation on said rear trailer about a longitudinal axis whereby said second trailer connection means provides stability from said lead trailer to said rear trailer.

7. In a trailer assembly adapted to be transported by a tractor comprising a lead trailer pivotally connected at its front end to said tractor, a rear trailer having a front frame portion, a towing dolly frame pivotally connected to said front frame portion, and a drawbar, said draw bar pivotally connected to said towing dolly frame and to a rear frame portion of said lead trailer, the improvement which comprises a steering stabilizing trailer connection mounted at one end to said rear frame portion of said lead trailer and mounted at its other end to said front frame portion of said rear trailer, said steering stabilizing trailer connection including an extensible telescopic strut, said strut having one end reciprocable in a housing and a second end reciprocable outside said housing, said housing being pivotally mounted to said lead trailer for horizontal pivoting about an axis transverse to the longitudinal axis of said lead trailer, extension means pivotally connected at one end to said second end of said telescopic strut for pivotal movement about horizontal and vertical axes, said extension means mounted at its other end to said rear trailer front frame portion for rotative movement about a longitudinal axis, whereby under certain conditions, said telescopic strut is extended from said housing by said extension means thereby preventing said rear trailer from becoming grossly longitudinally misaligned with said lead trailer.

8. The trailer assembly defined in claim 7 wherein said housing includes a hollow box-like interior, said telescopic strut being rectangular and slidable within the hollow interior of said housing.

9. The trailer assembly of claim 7, wherein said extension means includes a coupling at one end pivotally connected to said telescopic strut and a shaft connected to said coupling having a first portion rotatably movable in a bearing sleeve, said bearing sleeve being mounted in a tubular housing fixed to the front frame portion of said rear trailer.

10. A trailer assembly adapted to be transported by a tractor comprising a lead trailer having front and rear frame portions, said front frame portion of said lead trailer being adapted to be pivotally connected to the tractor, a rear trailer having front and rear frame portions, a steerable towing vehicle located under the front frame portion of said rear trailer, said rear trailer being pivotally connected to said steerable towing vehicle, a first trailer connection means pivotally connected at one end to said rear frame portion of said lead trailer about a first vertical pivot and pivotally connected at its other end to said steerable towing vehicle about a first horizontal pivot, and a second trailer connection means pivotally connected at one end to said rear frame portion of said lead trailer about a second horizontal pivot which is generally parallel to said first horizontal pivot and rotatably connected at its other end to said front frame portion of said rear trailer for rotation about a longitudinal axis, said second connection including means for pivoting said one end relative to said other end about a second vertical pivot which is generally parallel to said first vertical pivot and positioned near said other end, whereby said second trailer connection means provides stability from said lead trailer to said rear trailer.

* * * * *